Patented Oct. 17, 1944

2,360,406

UNITED STATES PATENT OFFICE 2,360,406

MANUFACTURE OF ARTIFICIAL FILAMENTS, FILMS, AND LIKE MATERIALS

Henry Dreyfus, London, and Robert Wighton Moncrieff and Charles William Sammons, Spondon, near Derby, England, assignors to Celanese Corporation of America, a corporation of Delaware No Drawing. Application May 28, 1941, Serial No. 395,612. In Great Britain June 21, 1940

7 Claims. (Cl. 18—54)

This invention relates to the production of artificial filaments, fibres, threads, yarns, films, foils and like shaped articles having a basis of highly polymeric organic substances.

There have recently been developed a large number of highly polymeric fibre- or film-forming organic substances formed by the union of the residues of the molecules of one or more reagents, each containing two reactive groups in the molecule, by the condensation of a reactive group of one molecule with a reactive group of another molecule, water, hydrochloric acid or a similar substance being eliminated during the reaction. For example, it has been shown that such polymers may be produced by condensing diamines with dicarboxylic or disulphonic acids, or with acid halides or esters of these acids, or by condensing amino-carboxylic acids or aminosulphonic acids with themselves or with each other, the condensation being continued until products of molecular weight from about 4000 up to 6000 or 10,000 or more are obtained. The reagents to be condensed to yield the fibre- or film-forming polymers should be such that there is substantially no tendency for the formation of cyclic compounds by intramolecular condensation. This may be achieved by selecting the reagents in such a way that the "unit length" of the resulting polymer consists of more than 6 atoms in a chain, and preferably more than 7 atoms. In the case of condensing diamines with dicarboxylic acids, for example, the unit length of the polymer is arrived at by adding the number of atoms in the chain joining the two nitrogen atoms of the diamines plus 2 to the number of atoms in the chain joining the two carboxylic groups in the dicarboxylic acids plus 2.

Various proposals have been put forward for converting these fibre- or film-forming polymers into shaped articles such as, for example, filaments. It has, for example, been proposed to fuse the polymers and to extrude them in molten condition. Further, it has been proposed to form solutions of the polymers in suitable substances, e. g. phenols and aliphatic acids, and to extrude these by wet or dry spinning methods so as to produce coagulated filamentary materials. This invention has particular relation to the process of producing filaments and other shaped articles from formic acid solutions of polyamides such as may be produced by the processes referred to above.

We have now found that very satisfactory shaped articles may be produced by shaping a formic acid solution of a fibre- or film-forming polyamide and setting it in a liquid medium comprising an organic aliphatic compound containing a hydroxyl group directly attached to a carbon atom, viz. an aliphatic alcohol or acid, said medium being a non-solvent for the said polyamide. The concentration of the polyamide solution to be shaped may be such that the solution is liquid or viscous at normal temperatures but more concentrated solutions may be employed if desired. In either case, the solution may be heated in order to bring it to the desired fluidity. For example, a solution of 40% by weight of polyhexamethylene diadipamide in formic acid may be satisfactorily extruded at a temperature of 50° C., the solution itself being fluid at temperatures from 10° to 15° C. below this temperature. On the other hand concentrated solutions may be employed at appropriate temperatures, the shaping and setting operations in such a case being carried out, for example, according to the processes of U. S. Patent No. 2,303,340 and U. S. application 369,405, so far as they relate to wet spinning processes. While particular reference has been made to formic acid as the solvent, other agents may be employed either alone or in admixture with formic acid and/or with themselves. Among such are, for example, other acids, especially aliphatic acids, e. g. acetic acid, and phenols, e. g. phenol, cresol and resorcinol.

The alcohols which may be employed in the coagulating media are, for example, ethyl alcohol, methyl alcohol and the various propyl and butyl alcohols. These are preferably employed in substantially anhydrous condition, but proportions of water up to 10 or 15% by weight or even more may be employed with only small effect on the characteristics of filaments or other articles produced. Of the aliphatic acids, which should generally be employed diluted with a non-solvent for the polyamide, especially water, formic acid is preferred but other aliphatic acids such as, for example, acetic, propionic and chloracetic acids may also be employed in appropriate concentrations.

Preferably, the coagulating medium comprises an aqueous aliphatic acid, and the concentration of such a medium may be up to 30 to 50 or 60% by weight or even more, depending, inter alia, upon the acid present in the medium. Thus, when the medium is an aqueous solution of formic acid relatively low concentrations, e. g. of the order of 2 or 5-15% by weight, may be employed, whereas with acetic acid it is preferable to employ an aqueous solution containing 40–50 or 55% by weight of acid. A notable characteristic of the filaments produced by extruding polyamide solutions in formic acid into aqueous aliphatic acids or into alcohols, is their response to a stretching operation. Indeed, by drawing-down filaments formed in this way, it is possible to obtain an extension of several hundred per cent, with increase in tenacity, to produce materials which have a very substantial elasticity.

The extruded materials may be wound up continuously with spinning on a suitable rotating member which is adapted to apply tension to the products before they are fully set. On the other hand, lengths of the materials may be allowed to collect in the setting medium itself, and may be wound up at intervals allowing for complete setting of the materials before any tension is applied, or the extruded solutions may be allowed to fall under gravity to the bottom of the setting medium, and be then drawn off to a winding device; in this way it is found that a permanent crinkle is assumed by the materials, which is of particular value when the filamentary materials are to be converted into voluminous yarns or into staple fibre. When staple fibre is formed, such a crinkle serves to improve the spinning qualities of the fibre. It will be understood that the essential feature for the production of the crinkle is that there shall be substantially no tension applied to the materials before they are fully set.

Reference has been made above to general methods by which polyamides for use according to the invention may be produced. Thus, for example, shaped products may be obtained from solutions of such polyamides as may be produced by condensation of diamines with di-acids, of amino-acids with themselves, or amides of dicarboxylic acids with dicarboxylic acids or with dihalogen derivatives of hydrocarbons.

Filamentary products produced according to the invention may be associated together, e. g. by twisting, to form yarns, and they may then be employed in the manufacture of woven, knitted or other fabrics. For the production of materials of modified appearance the extruded solutions may contain agents such as, for example, pigments and dyes; fire retardants may also be incorporated in the solutions. Staple fibres may be produced from the filamentary products of the invention by cutting after winding or while travelling, and such fibres are advantageously produced from filamentary materials which have been crinkled, e. g. by twisting as yarn, setting the twist by steaming or similar treatment and untwisting, or by the special spinning method referred to above. The fibres so produced may be spun into yarn. Films, foils and the like produced according to the invention may be employed for the purposes to which thermoplastic films, foils and like products have been previously applied. For example, they may be employed for wrapping purposes, as bases for photographic materials, as glass substitutes and for the manufacture of splinterless glass.

Example I 100 parts by weight of recrystallised hexamethylene diammonium adipate and 300 parts by weight of redistilled phenol are heated together for 8 hours at 190° C. under an atmosphere of nitrogen while allowing water which is formed to escape from the reaction vessel. There is then added to the melt 0.5 part by weight of adipic acid, and heating is continued for a further 10 hours under the same conditions. The product, cooled to room temperature, is dissolved in 85% formic acid at 25° C. and the resulting solution poured into 50/50 acetone/water to precipitate polyamide as a white fibrous mass, which is purified by washing with hot water and with hot acetone.

In 60 parts by weight of 97% formic acid, 40 parts by weight of the purified polyamide are dissolved at below 75° C. and the product is employed as a spinning solution. It is introduced into a stainless steel pressure vessel carrying a tapering outlet which terminates in a filter, comprising a pad of glass wool between two discs of fine stainless steel gauze, and a spinning jet. The spinning solution, at a temperature of 25° C., is extruded under pressure of nitrogen into a bath of cold 8% formic acid in which the spinning jet is submerged. The extruded materials are drawn out from the jet under tension and wound up on a rotating drum immersed in the bath. The filaments may be re-wound on a bobbin or other collecting device and during this operation may be drawn out still further, to increase their tenacity and yield products of high elasticity.

Example II

Similar results to those of Example I are obtained by carrying out the process described in that example with the substitution of a bath of cold substantially anhydrous ethyl alcohol for the bath of cold 8% formic acid as the setting medium.

Having described our invention, what we desire to secure by Letters Patent is:

1. Process for the production of artificial filaments, fibers, threads, yarns, films, foils and like shaped articles, which comprises shaping a solution of a fiber-forming polyamide and setting it in a liquid medium comprising at least 2% of an acid selected from the group consisting of formic acid and acetic acid said medium being a non-solvent for the polymer.

2. Process for the production of artificial filaments, fibers, threads, yarns, films, foils and like shaped articles, which comprises shaping a solution of a fiber-forming polyamide in an aliphatic acid and setting it in a liquid medium comprising at least 2% of an acid selected from the group consisting of formic acid and acetic acid said medium being a non-solvent for the polymer.

3. Process for the production of artificial filaments, fibers, threads, yarns, films, foils and like shaped articles, which comprises shaping a solution of a fiber-forming polyamide in formic acid and setting it in a liquid medium comprising at least 2% of an acid selected from the group consisting of formic acid and acetic acid said medium being a non-solvent for the polymer.

4. Process for the production of artificial filaments, fibers, threads, yarns, films, foils and like shaped articles, which comprises shaping a solution of a fiber-forming polyamide in a phenol and setting it in a liquid medium comprising at least 2% of an acid selected from the group consisting of formic acid and acetic acid said medium being a non-solvent for the polymer.

5. Process for the production of artificial filaments, fibers, threads, yarns, films, foils and like shaped articles, which comprises shaping a solution of a fiber-forming polyamide and setting it in a liquid medium comprising an aqueous solution of an acid selected from the group consisting of formic acid and acetic acid of at least 2% concentration, said solution being a non-solvent for the polymer.

6. Process for the production of artificial filaments, fibers, threads, yarns, films, foils and like shaped articles, which comprises shaping a solution of a fiber-forming polyamide and setting it in a liquid medium comprising an aqueous solution of formic acid containing 5–15% by weight of the acid.

7. Process for the production of artificial filaments, fibers, threads, yarns, films, foils and like shaped articles, which comprises shaping a solution of a fiber-forming polyamide and setting it in a liquid medium comprising an aqueous solution of acetic acid containing 40–55% by weight of the acid.

HENRY DREYFUS.
ROBERT WIGHTON MONCRIEFF.
CHARLES WILLIAM SAMMONS.